(12) United States Patent
Geurts (10) Patent No.: US 10,791,292 B1
(45) Date of Patent: Sep. 29, 2020

(54) IMAGE SENSORS HAVING HIGH DYNAMIC RANGE IMAGING PIXELS

(71) Applicant: SEMICONDUCTOR COMPONENTS INDUSTRIES, LLC, Phoenix, AZ (US)

(72) Inventor: Tomas Geurts, Haasrode (BE)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/502,298

(22) Filed: Jul. 3, 2019

Related U.S. Application Data (60) Provisional application No. 62/840,611, filed on Apr. 30, 2019.

(51) Int. Cl.
*H04N 5/374* (2011.01)
*H04N 5/3745* (2011.01)
*H04N 5/355* (2011.01)
*H04N 5/359* (2011.01)
*H04N 5/369* (2011.01)

(52) U.S. Cl.
CPC ....... *H04N 5/37452* (2013.01); *H04N 5/3559* (2013.01); *H04N 5/3591* (2013.01); *H04N 5/379* (2018.08)

(58) Field of Classification Search
CPC .. H04N 5/37452; H04N 5/3591; H04N 5/379; H04N 5/3559
See application file for complete search history.

(56) References Cited

U.S. PATENT DOCUMENTS

| | | | |
|---|---|---|---|
| 9,900,481 B2 * | 2/2018 | Geurts | H04N 5/359 |
| 2017/0099423 A1 | 4/2017 | Cremers et al. | |
| 2017/0099446 A1 | 4/2017 | Cremers et al. | |
| 2017/0104946 A1 * | 4/2017 | Hong | H01L 27/14627 |
| 2017/0244921 A1 * | 8/2017 | Velichko | H04N 5/3597 |
| 2017/0366766 A1 * | 12/2017 | Geurts | H04N 5/372 |
| 2018/0115730 A1 | 4/2018 | Velichko | |
| 2019/0124278 A1 | 4/2019 | Velichko | |
| 2019/0260949 A1 * | 8/2019 | Geurts | H01L 27/1461 |

OTHER PUBLICATIONS

Johnson, U.S. Appl. No. 16/185,139, filed Nov. 9, 2018.

* cited by examiner

*Primary Examiner* — Padma Haliyur
(74) *Attorney, Agent, or Firm* — Treyz Law Group, P.C.; Joseph F. Guihan (57) ABSTRACT

A high dynamic range imaging pixel may include a photodiode that generates charge in response to incident light. Charge from the photodiode may be coupled to a voltage supply and discarded or transferred to a charge storage region such as a storage diode. Alternating between discarding and integrating charge enables flicker mitigation. When the generated charge in the charge storage region exceeds a first charge level, the charge may overflow through a first transistor to a first storage capacitor. When the generated charge exceeds a second charge level that is higher than the first charge level, the charge may overflow through a second transistor. The charge that overflows through the second transistor may alternately be coupled to a voltage supply and drained or transferred to a second storage capacitor for subsequent readout. Diverting more overflow charge to the voltage supply may increase the dynamic range of the pixel.

18 Claims, 7 Drawing Sheets

IMAGE SENSORS HAVING HIGH DYNAMIC RANGE IMAGING PIXELS

CROSS-REFERENCE TO RELATED APPLICATIONS

This application claims the benefit of U.S. Provisional Patent Application No. 62/840,611, filed on Apr. 30, 2019, the entire contents of which is incorporated herein by reference.

BACKGROUND

This relates generally to imaging devices, and more particularly, to imaging devices having high dynamic range imaging pixels.

Image sensors are commonly used in electronic devices such as cellular telephones, cameras, and computers to capture images. In a typical arrangement, an image sensor includes an array of image pixels arranged in pixel rows and pixel columns. Circuitry may be coupled to each pixel column for reading out image signals from the image pixels.

Typical image pixels contain a photodiode for generating charge in response to incident light. Image pixels may also include a charge storage region for storing charge that is generated in the photodiode. Image sensors can operate using a global shutter or a rolling shutter scheme. In a global shutter, every pixel in the image sensor may simultaneously capture an image, whereas in a rolling shutter each row of pixels may sequentially capture an image.

Some conventional image sensors may be able to operate in a high dynamic range (HDR) mode. HDR operation may be accomplished in image sensors by assigning alternate rows of pixels different integration times. However, conventional image sensors may sometimes experience lower than desired resolution, lower than desired sensitivity, higher than desired noise levels, and lower than desired quantum efficiency.

It would therefore be desirable to be able to provide improved high dynamic range operation in image sensors.

DETAILED DESCRIPTION

Embodiments of the present invention relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the pixels and readout circuitry for reading out image signals corresponding to the electric charge generated by the photosensitive elements.

Figure 1:
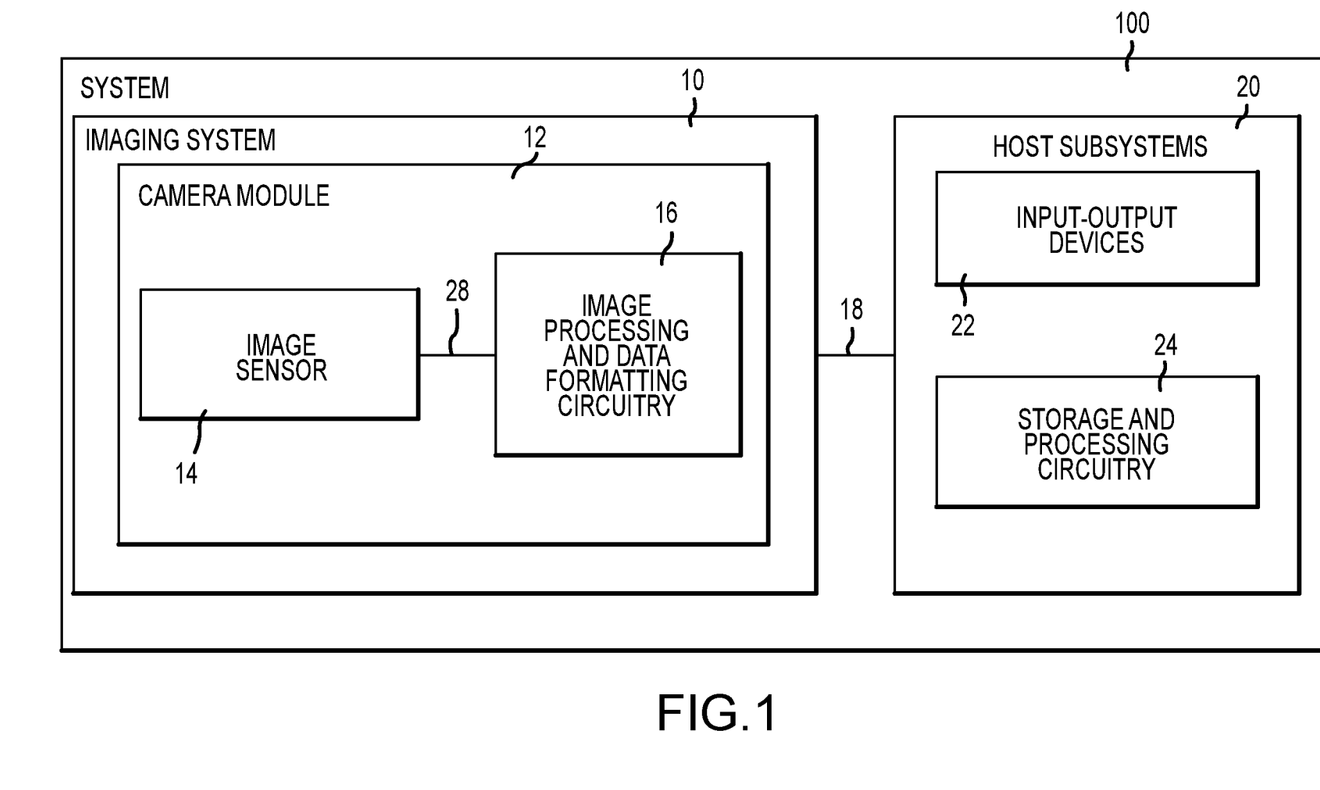
FIG. 1 is a diagram of an illustrative electronic device having an image sensor in accordance with an embodiment.

FIG. 1 is a diagram of an illustrative imaging and response system including an imaging system that uses an image sensor to capture images. System 100 of FIG. 1 may be an electronic device such as a camera, a cellular telephone, a video camera, or other electronic device that captures digital image data, may be a vehicle safety system (e.g., an active braking system or other vehicle safety system), or may be a surveillance system.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses.

Each image sensor in camera module 12 may be identical or there may be different types of image sensors in a given image sensor array integrated circuit. During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), address circuitry, etc.

Still and video image data from camera sensor 14 may be provided to image processing and data formatting circuitry 16 via path 28. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include processing software for detecting objects in images, detecting motion of objects between image frames, determining distances to objects in images, filtering or otherwise processing images provided by imaging system 10.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid-state drives, etc.). Storage and processing circuitry 24 may also include microprocessors, microcontrollers, digital signal processors, application specific integrated circuits, etc.

Figure 2:
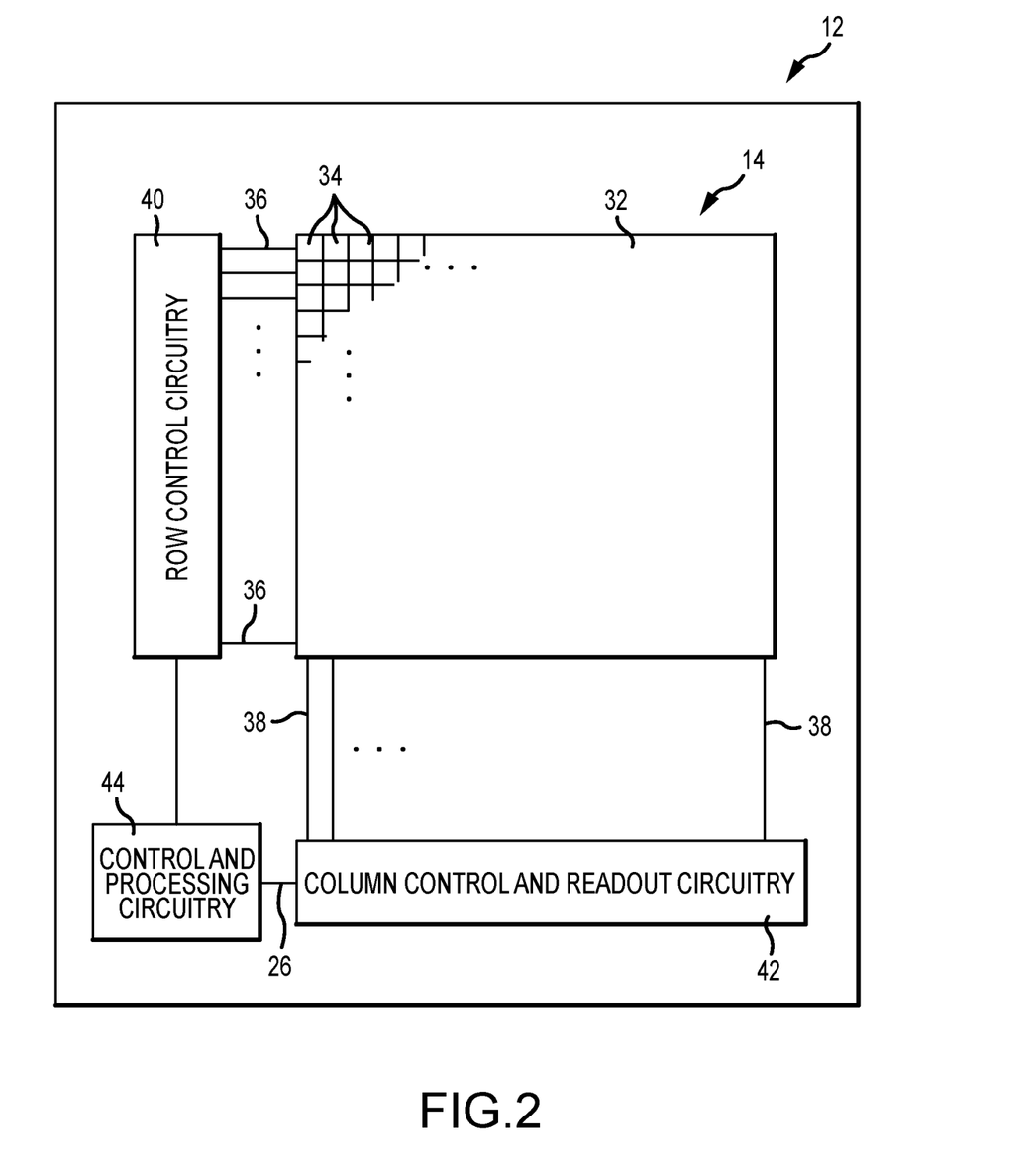
FIG. 2 is a diagram of an illustrative pixel array and associated readout circuitry for reading out image signals in an image sensor in accordance with an embodiment.

An example of an arrangement for camera module 12 of FIG. 1 is shown in FIG. 2. As shown in FIG. 2, camera module 12 includes image sensor 14 and control and processing circuitry 44. Control and processing circuitry 44 may correspond to image processing and data formatting circuitry 16 in FIG. 1. Image sensor 14 may include a pixel array such as array 32 of pixels 34 (sometimes referred to herein as image sensor pixels, imaging pixels, or image pixels 34) and may also include control circuitry 40 and 42. Control and processing circuitry 44 may be coupled to row control circuitry 40 and may be coupled to column control and readout circuitry 42 via data path 26. Row control circuitry 40 may receive row addresses from control and processing circuitry 44 and may supply corresponding row control signals to image pixels 34 over control paths 36 (e.g., dual conversion gain control signals, pixel reset control signals, charge transfer control signals, blooming control signals, row select control signals, or any other desired pixel control signals). Column control and readout circuitry 42 may be coupled to the columns of pixel array 32 via one or more conductive lines such as column lines 38. Column lines 38 may be coupled to each column of image pixels 34 in image pixel array 32 (e.g., each column of pixels may be coupled to a corresponding column line 38). Column lines 38 may be used for reading out image signals from image pixels 34 and for supplying bias signals (e.g., bias currents or bias voltages) to image pixels 34. During image pixel readout operations, a pixel row in image pixel array 32 may be selected using row control circuitry 40 and image data associated with image pixels 34 of that pixel row may be read out by column control and readout circuitry 42 on column lines 38.

Column control and readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, and column memory for storing the read out signals and any other desired data. Column control and readout circuitry 42 may output digital pixel values to control and processing circuitry 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

Pixel array 32 may be provided with a color filter array having multiple color filter elements which allows a single image sensor to sample light of different colors. As an example, image sensor pixels such as the image pixels in array 32 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). These examples are merely illustrative and, in general, color filter elements of any desired color and in any desired pattern may be formed over any desired number of image pixels 34.

If desired, array 32 may be part of a stacked-die arrangement in which pixels 34 of array 32 are split between two or more stacked substrates. In such an arrangement, each of the pixels 34 in the array 32 may be split between the two dies at any desired node within the pixel. As an example, a node such as the floating diffusion node may be formed across two dies. Pixel circuitry that includes the photodiode and the circuitry coupled between the photodiode and the desired node (such as the floating diffusion node, in the present example) may be formed on a first die, and the remaining pixel circuitry may be formed on a second die. The desired node may be formed on (i.e., as a part of) a coupling structure (such as a conductive pad, a micro-pad, a conductive interconnect structure, or a conductive via) that connects the two dies. Before the two dies are bonded, the coupling structure may have a first portion on the first die and may have a second portion on the second die. The first die and the second die may be bonded to each other such that first portion of the coupling structure and the second portion of the coupling structure are bonded together and are electrically coupled. If desired, the first and second portions of the coupling structure may be compression bonded to each other. However, this is merely illustrative. If desired, the first and second portions of the coupling structures formed on the respective first and second dies may be bonded together using any metal-to-metal bonding technique, such as soldering or welding.

As mentioned above, the desired node in the pixel circuit that is split across the two dies may be a floating diffusion node. Alternatively, the desired node in the pixel circuit that is split across the two dies may be the node between a floating diffusion region and the gate of a source follower transistor (i.e., the floating diffusion node may be formed on the first die on which the photodiode is formed, while the coupling structure may connect the floating diffusion node to the source follower transistor on the second die), the node between a floating diffusion region and a source-drain node of a transfer transistor (i.e., the floating diffusion node may be formed on the second die on which the photodiode is not located), the node between a source-drain node of a source follower transistor and a row select transistor, or any other desired node of the pixel circuit.

In general, array 32, row control circuitry 40, column control and readout circuitry 42, and control and processing circuitry 44 may be split between two or more stacked substrates. In one example, array 32 may be formed in a first substrate and row control circuitry 40, column control and readout circuitry 42, and control and processing circuitry 44 may be formed in a second substrate. In another example, array 32 may be split between first and second substrates (using one of the pixel splitting schemes described above) and row control circuitry 40, column control and readout circuitry 42, and control and processing circuitry 44 may be formed in a third substrate.

To increase high dynamic range in imaging pixels, imaging pixels may be formed with an overflow capacitor. The photodiode for the imaging pixel generates charge. After the charge exceeds a certain level, the excess charge may overflow the photodiode into a storage capacitor. The charge from both the storage capacitor and the photodiode may be read out after the integration time is complete. This effectively increases the dynamic range of the pixel. The storage capacitor in these types of pixels may be referred to as an overflow capacitor.

Figure 3:
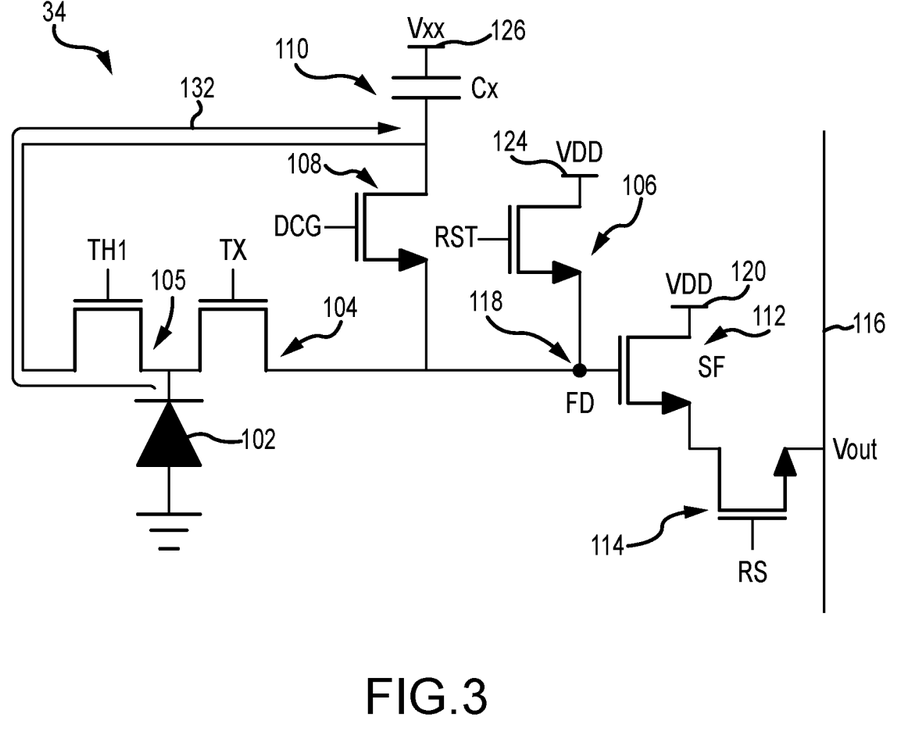
FIG. 3 is a circuit diagram of an illustrative imaging pixel that includes an overflow capacitor in accordance with an embodiment.

FIG. 3 is a circuit diagram of an imaging pixel having a photosensitive element and a storage capacitor. As shown in FIG. 3, image pixel 34 includes photosensitive element 102 (e.g., a photodiode). Photosensitive element 102 has a first terminal that is coupled to ground. The second terminal of photosensitive element 102 is coupled to transfer transistor 104 and transistor 105. Transfer transistor 104 is coupled to floating diffusion (FD) region 118. Transistor 105 (sometimes referred to as threshold transistor 105) is coupled between photodiode 102 and storage capacitor 110. A reset transistor 106 may be coupled between floating diffusion region 118 and voltage supply 124. Voltage supply 124 may provide a voltage VDD. Floating diffusion region 118 may be a doped semiconductor region (e.g., a region in a silicon substrate that is doped by ion implantation, impurity diffusion, or other doping process). Floating diffusion 118 has an associated capacitance. Gain select transistor 108 has a first terminal coupled to floating diffusion region 118 and a second terminal coupled to storage capacitor 110 (Cx). Dual conversion gain capacitor 110 may have a first plate 110-1 (sometimes referred to as an upper plate or top plate) coupled to the second terminal of the gain select transistor. Dual conversion gain capacitor 110 may have a second plate 110-2 (sometimes referred to as a lower plate or bottom plate) that is coupled to voltage supply 126. Voltage supply may provide a voltage Vxx.

Source follower transistor 112 has a gate terminal coupled to floating diffusion region 118 and a first terminal of reset transistor 106. Source follower transistor 112 also has a first source-drain terminal coupled to voltage supply 120. Voltage supply 120 may provide a power supply voltage VDD. The power supply voltage at power supplies 120 and 124 may be the same or may be different. In this application, each transistor is illustrated as having three terminals: a source, a drain, and a gate. The source and drain terminals of each transistor may be changed depending on how the transistors are biased and the type of transistor used. For the sake of simplicity, the source and drain terminals are referred to herein as source-drain terminals or simply terminals. A second source-drain terminal of source follower transistor 112 is coupled to column output line 116 through row select transistor 114. The source follower transistor, row select transistor, and column output line may sometimes collectively be referred to as a readout circuit or as readout circuitry.

A gate terminal of transfer transistor 104 receives control signal TX. A gate terminal of threshold transistor 105 receives control signal TH1. A gate terminal of gain select transistor 108 receives control signal DCG. A gate terminal of reset transistor 106 receives control signal RST. A gate terminal of row select transistor 114 receives control signal RS. Control signals TX, DCG, RST, RS, and TH1 may be provided by row control circuitry (e.g., row control circuitry 40 in FIG. 2) over control paths (e.g., control paths 36 in FIG. 2).

Gain select transistor 108 and dual conversion gain capacitor 110 may be used by pixel 34 to implement a dual conversion gain mode. In particular, pixel 34 may be operable in a high conversion gain mode and in a low conversion gain mode. If gain select transistor 108 is disabled, pixel 34 will be placed in a high conversion gain mode. If gain select transistor 108 is enabled, pixel 34 will be placed in a low conversion gain mode. When gain select transistor 108 is turned on, the dual conversion gain capacitor 110 may be switched into use to provide floating diffusion region 118 with additional capacitance. This results in lower conversion gain for pixel 34. When gain select transistor 108 is turned off, the additional loading of the capacitor is removed and the pixel reverts to a relatively higher pixel conversion gain configuration.

To allow overflow of charge from photodiode 102 to storage capacitor 110 and increase dynamic range, control signal TH1 for threshold transistor 105 may be set to an intermediate voltage level during the integration time. When the charge levels in photodiode 102 exceed a given level (set by control signal TH1), charge may overflow into capacitor 110. For example, the overflow charge may follow path 132. This example is merely illustrative, and control signal TX for transfer transistor 104 may instead be set to an intermediate voltage level that allows charge to pass to capacitor 110 when the charge levels exceed a given level in the photodiode.

Including storage capacitor 110 (Cx) in the imaging pixel increases the dynamic range of the pixel relative to embodiments where the storage capacitor is not included. However, the dynamic range may still be limited by the size of storage capacitor 110. For additional improvements to dynamic range, an arrangement of the type shown in FIG. 4 may be used.

Figure 4:
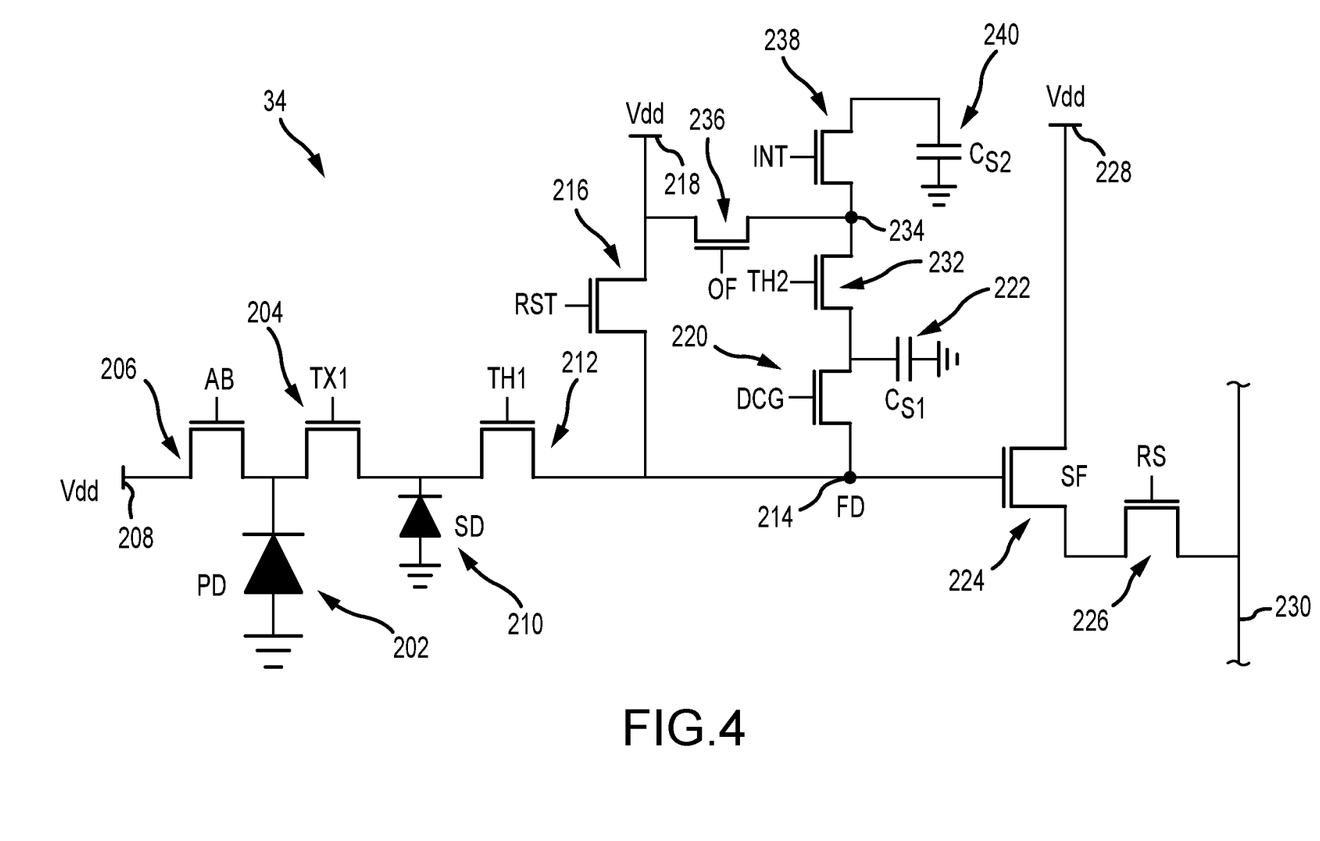
FIG. 4 is a circuit diagram of an illustrative imaging pixel that includes a first overflow capacitor and a charge directing structure that intermittently directs charge to a second overflow capacitor in accordance with an embodiment.

FIG. 4 is a circuit diagram of an illustrative high dynamic range imaging pixel that includes a first overflow capacitor and a charge directing structure that intermittently directs charge to a second overflow capacitor. As shown in FIG. 4, pixel 34 includes photosensitive element 202 (e.g., a photodiode). Photosensitive element 202 has a first terminal that is coupled to ground. The second terminal of photosensitive element 202 is coupled to transfer transistor 204 and antiblooming transistor 206. Anti-blooming transistor 206 is coupled between photodiode 202 and bias voltage supply terminal 208. Transfer transistor 204 is coupled between photodiode 202 and storage diode 210. The example of using a storage diode as a charge storage region is merely illustrative. If desired a storage capacitor may be used instead of the storage diode, a storage gate may be used instead of the storage diode, or a storage gate may be used instead of transfer transistor 204 and storage diode 210. Storage diode 210 may therefore sometimes be referred to as charge storage region 210.

Transistor 212 (sometimes referred to as threshold transistor 212) is coupled between charge storage region 210 and floating diffusion region 214 (FD). A reset transistor 216 may be coupled between floating diffusion region 214 and bias voltage supply terminal 218. Floating diffusion region 214 may be a doped semiconductor region (e.g., a region in a silicon substrate that is doped by ion implantation, impurity diffusion, or other doping process). Floating diffusion 214 has an associated capacitance. Gain select transistor 220 has a first terminal coupled to floating diffusion region 214 and a second terminal coupled to a first storage capacitor 222 (Csi). Capacitor 222 may have a first plate coupled to the second terminal of the gain select transistor 220 and a second plate that is coupled to ground.

Source follower transistor 224 has a gate terminal coupled to floating diffusion region 214. Source follower transistor 224 also has a first source-drain terminal coupled to bias voltage supply terminal 228. Voltage supply 228 may provide a power supply voltage $V_{DD}$. The power supply voltage at power supplies 208, 218, and 228 may be the same or may be different. In this application, each transistor is illustrated as having three terminals: a source, a drain, and a gate. The source and drain terminals of each transistor may be changed depending on how the transistors are biased and the type of transistor used. For the sake of simplicity, the source and drain terminals are referred to herein as source-drain terminals or simply terminals. A second source-drain terminal of source follower transistor 224 is coupled to column output line 230 through row select transistor 226. The source follower transistor, row select transistor, and column output line may sometimes collectively be referred to as a readout circuit or as readout circuitry.

Transistor 232 (sometimes referred to as threshold transistor 232) may be coupled to storage capacitor 222. Transistor 232 may be coupled to a fully depleted node 234. Transistor 236 is coupled between node 234 and bias voltage supply terminal 218. The example of transistor 236 being coupled to the same voltage supply as reset transistor 216 is merely illustrative. Transistor 236 may be coupled to a different voltage supply than reset transistor 216 if desired. Transistor 238 is coupled between node 234 and an additional storage capacitor 240 ($C_{S2}$). Transistors 236 and 238 may sometimes collectively be referred to as a charge directing structure, a coupled gate structure, or charge directing circuitry. Because node 234 between transistors 236 and 238 and transistor 232 is fully depleted, node 234 will add no capacitance and will retain no charge after each one of the modulation cycles. This allows transistors 236 and 238 to selectively and repeatedly direct charge to either bias voltage supply terminal 218 or capacitor 240.

A gate terminal of transfer transistor 204 receives control signal TX1. A gate terminal of anti-blooming transistor 206 receives control signal AB. A gate terminal of threshold transistor 212 receives control signal TH1. A gate terminal of reset transistor 216 receives control signal RST. A gate terminal of transistor 220 receives control signal DCG. A gate terminal of transistor 232 receives control signal TH2. A gate terminal of transistor 236 receives control signal OF. A gate terminal of transistor 238 receives control signal INT. A gate terminal of transistor 226 receives control signal RS. Control signals TX1, AB, TH1, RST, DCG, TH2, OF, INT, and RS may be provided by row control circuitry (e.g., row control circuitry 40 in FIG. 2) over control paths (e.g., control paths 36 in FIG. 2).

During operation of the pixel in FIG. 4, charge may accumulate in photodiode 202. Charge from photodiode 202 may be transferred to charge storage region 210 by asserting transfer transistor 204 or may be disposed of by asserting anti-blooming transistor 206. When anti-blooming transistor 206 is asserted, charge from the photodiode may be drained (i.e., not integrated). When transfer transistor 204 is asserted, charge from the photodiode is kept (i.e., integrated). Moving charge from photodiode 202 to charge storage region 210 may be noise free and may have a low associated dark current. Effectively, this allows for the photodiode to either be integrated or not integrated according to any desired modulation scheme.

Image artifacts may sometimes be caused by moving objects, moving or shaking camera, flickering lighting, and objects with changing illumination in an image frame. Such artifacts may include, for example, missing parts of an object, edge color artifacts, and object distortion. Examples of objects with changing illumination include light-emitting diode (LED) traffic signs (which can flicker several hundred times per second) and LED brake lights or headlights of modern cars. Without performing flicker mitigation operations, the image sensor may acquire light asynchronously relative to the scenery being captured. This means that portions of an image frame may not be exposed for part of the frame duration. This is especially true for bright scenery when integration times are much shorter than the frame time used. Zones in an image frame that are not fully exposed to dynamic scenery may result in object distortion, ghosting effects, and color artifacts when the scenery includes moving or fast-changing objects. Similar effects may be observed when the camera is moving or shaking during image capture operations.

To mitigate artifacts caused by LED flickering in a scene, transistor 206 may be used to control when photosensitive element 202 acquires charge. For example, when anti-blooming transistor 206 is deasserted, charge may accumulate in photodiode 202. When anti-blooming transistor 206 is asserted, charge may be drained out from photodiode 202 and discarded. Anti-blooming transistor 206 may be operated dynamically by being opened and closed multiple times throughout the duration of an imaging frame. Each cycle of dynamic shutter operation may include a period of time when the shutter is 'open' (e.g., when anti-blooming transistor 206 is deasserted) and a period of time when the shutter is 'closed' (e.g., when anti-blooming transistor 206 is asserted). At the end of each cycle, the charge that has been acquired on the photosensitive element during the cycle may be transferred from photodiode 202 to charge storage region 210 by asserting transfer transistor 204. By repeating this sequence multiple times, the charge accumulated on charge storage region 210 may represent the entire scenery being captured without significantly unexposed "blind" time spots.

Charge from photodiode 202 accumulates in storage region 210 with each assertion of transfer transistor 204. However, to increase the dynamic range of the imaging pixel, additional charge storage may be used in addition to storage region 210. Charge may overflow from charge storage region 210 to floating diffusion region 214 and storage capacitor 222. To allow overflow of charge from charge storage region 210 to storage capacitor 222, control signal TH1 for threshold transistor 212 may be set to an intermediate voltage level during the integration time. When the charge levels in charge storage region 210 exceed a given level (set by control signal TH1), charge may overflow into floating diffusion region 214. When transistor 220 is asserted, the charge may overflow from charge storage region 210 into floating diffusion region 214 and storage capacitor 222.

Storage capacitor 240 is provided to further increase the dynamic range of the imaging pixel. To allow overflow of charge from storage capacitor 222, control signal TH2 for threshold transistor 232 may be set to an intermediate voltage level. When the charge levels in capacitor 222 exceed a given level (set by control signal TH2), charge may overflow onto node 234 (e.g., onto the charge directing structure formed by transistors 236 and 238).

Once at node 234, the overflow charge may follow one of two paths. When transistor 236 is asserted (and transistor 238 is deasserted), the charge may be discarded at bias voltage supply terminal 218. When transistor 238 is asserted (and transistor 236 is deasserted), the charge may be transferred to storage capacitor 240.

During the integration period, transistors 236 and 238 may be asserted in a mutually exclusive manner (or nearly mutually exclusive manner) to direct the overflow charge along one of two paths. Transistors 236 and 238 may be in the same state (e.g., both asserted or both deasserted) for less than 20% of the integration time, less than 10% of the integration time, less than 5% of the integration time, less than 2% of the integration time, less than 1% of the integration time, less than 0.1% of the integration time, less than 0.01% of the integration time, etc. If transistor 236 is asserted, transistor 238 will be deasserted. In this state, charge will be drained to voltage supply 218. If transistor 238 is asserted, transistor 236 will be deasserted. In this state, charge will be transferred to storage capacitor 240.

Figure 5:
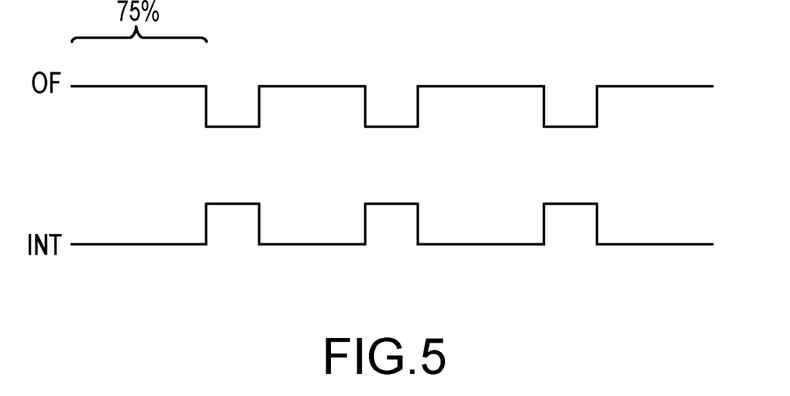
FIG. 5 is a timing diagram showing operation of an illustrative imaging pixel such as the pixel of FIG. 4 when more overflow charge is disposed of then integrated in accordance with an embodiment.

The arrangement of the charge directing structure may allow the dynamic range of the pixel to be easily controlled by adjusting the amount of time transistors 236 and 238 are each asserted. For example, consider the timing diagram of FIG. 5. FIG. 5 shows the OF control signal and INT control signal during the integration period of pixel 34. As shown, when OF is high, INT is low (and vice-versa). The signals may cycle between high and low states at consistent rate. The amount of time the OF signal is high in each cycle sets the dynamic range of the pixel. For example, in FIG. 5 OF is high for 75% of each cycle. For the remaining 25% of the cycle, OF is low (and INT is high). This means that, of the overflow charge received by the coupled gate structure (at node 234), 75% is drained to voltage supply 218 and only 25% is transferred to storage capacitor 240. This known ratio may be used to extrapolate a detected overflow signal. In this case, for example, the amount of charge sampled from capacitor 240 may be multiplied by four (because integration was only occurring 25% of the time) to determine how much overflow charge was received by the coupled gate structure. This effectively increases the storage capacity of storage capacitor 240 by four times, which improves the dynamic range of the pixel.

The frequency of asserting between the OF control signal and the INT control signal can be constant or may vary. For example, if the OF control signal is configured to be asserted for 50% of the integration time (and the INT control signal is therefore also configured to be asserted for 50% of the integration time), the OF signal could be asserted with a constant frequency (e.g., 1 millisecond asserted, then 1 millisecond deasserted, then 1 millisecond asserted, then 1 millisecond deasserted, etc.). Alternatively, the duration of each assertion and deassertion may vary across the integration time while still totaling 50% of the integration time.

Figure 6:
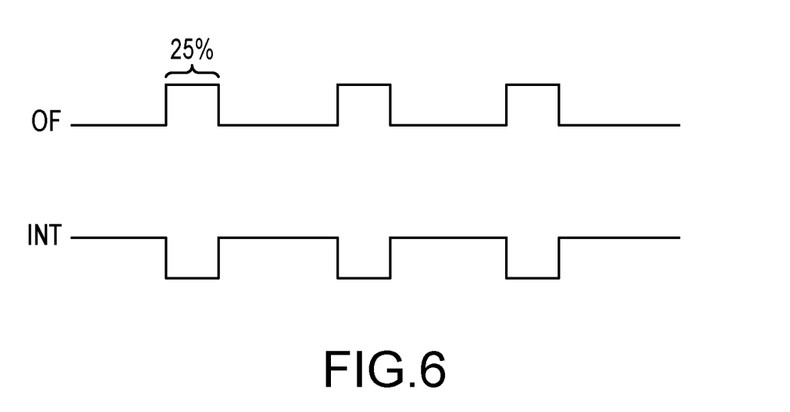
FIG. 6 is a timing diagram showing operation of an illustrative imaging pixel such as the pixel of FIG. 4 when more overflow charge is integrated than disposed of in accordance with an embodiment.

The dynamic range of the pixel may therefore be easily controlled by selecting the amount of time OF is asserted. The more time OF is asserted, the higher the dynamic range of the pixel will be. However, the more time OF is asserted, the worse the signal to noise ratio (SNR) of the sample will be. In FIG. 6, an alternate timing diagram for the OF control signal and INT control signal is shown during the integration period of pixel 34. As shown, when OF is high, INT is low (and vice-versa). The signals may cycle between high and low states at a consistent rate. In FIG. 6, OF is high for 25% of each cycle. For the remaining 75% of the cycle, OF is low (and INT is high). This means that, of the overflow charge received by the coupled gate structure (at node 234), 25% is drained to voltage supply 218 and 75% is transferred to storage capacitor 240. When using the duty cycle of FIG. 6, the pixel will have a lower dynamic range compared to the duty cycle of FIG. 5. However, the pixel will have an improved signal to noise ratio in FIG. 6 compared to FIG. 5.

Transistor 236 may be asserted for any desired percentage of time during the integration time of the pixel. The duty cycle may be predetermined or may be updated dynamically by control circuitry in the image sensor (e.g., in response to incident light levels). For example, transistor 236 may be asserted more than 95% of the time, more than 90% of the time, more than 75% of the time, more than 65% of the time, more than 50% of the time, more than 40% of the time, more than 30% of the time, more than 20% of the time, more than 10% of the time, more than 5% of the time, less than 95% of the time, less than 90% of the time, less than 75% of the time, less than 65% of the time, less than 50% of the time, less than 40% of the time, less than 30% of the time, less than 20% of the time, less than 10% of the time, less than 5% of the time, between 60% and 90% of the time, between 10% and 40% of the time, etc. Said another way, the time that transistor 236 is asserted divided by the time that transistor 236 is not asserted (and integration transistor 238 is asserted) may be equal to 1, greater than 1, greater than 2, greater than 3, greater than 4, greater than 10, greater than 20, less than 20, less than 10, less than 0.5, less than 0.1, less than 0.05, more than 0.05, etc.

At the end of the integration time, charge may be present in charge storage region 210, floating diffusion region 214, storage capacitor 222, and/or storage capacitor 240. Charge from all of these locations may therefore be sampled during the readout process. There are numerous options for the order and manner in which the charge can be sampled during the readout process. In general, charge will be sampled onto column output line 230 when row select transistor 226 is asserted. In one illustrative example, the amount of charge on the floating diffusion region may be sampled, then the amount of charge in charge storage region 210 and photodiode 202 may be sampled, then the amount of charge on storage capacitor 222 may be sampled, and then the amount of charge on storage capacitor 240 may be sampled.

Any desired reset value samples may be obtained during the readout process. Reset value samples may be used for double sampling techniques. In double sampling, a reset value and a signal value are obtained during readout. The reset value may then be subtracted from the signal value during subsequent processing to help correct for noise. The double sampling may be correlated double sampling (in which the reset value is sampled before the signal value) or uncorrelated double sampling (in which the reset value is sampled after the signal value is sampled). Any of the samples taken during operation of the pixel of FIG. 4 may use correlated double sampling or uncorrelated double sampling.

The readouts performed by pixel 34 may be high conversion gain readouts or low conversion gain readouts. If gain select transistor 220 is disabled during readout, pixel 34 will be placed in a high conversion gain mode. If gain select transistor 220 is enabled during readout, pixel 34 will be placed in a low conversion gain mode. Any desired conversion gain mode may be used for each readout.

There are numerous was to read out charge from storage capacitor 240. In FIG. 4, charge from storage capacitor 240 may be transferred to floating diffusion region 214 by asserting transistors 238, 232, and 220. The charge may then be sampled. This example, however, is merely illustrative. In another possible embodiment, an additional transistor may be included to couple the storage capacitor directly to the gate of source follower transistor 226. An arrangement of this type is shown in FIG. 7.

Figure 7:
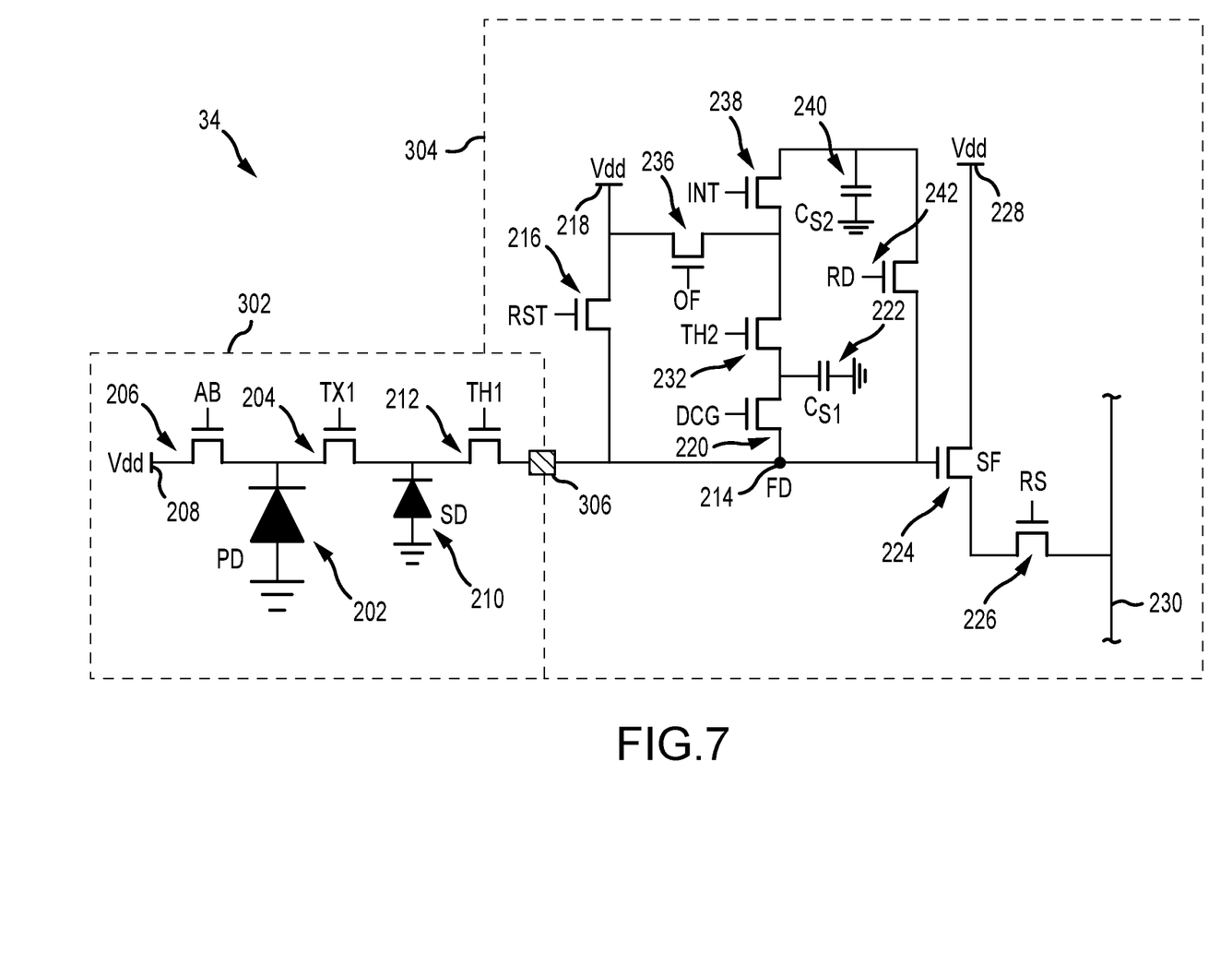
FIG. 7 is a circuit diagram of an illustrative imaging pixel with first and second storage capacitors, a charge directing structure, a transistor that couples the second storage capacitor to a floating diffusion region for readout, and a conductive interconnect layer between first and second substrates in accordance with an embodiment.

As shown in FIG. 7, transistor 242 may be coupled between storage capacitor 240 and source follower transistor 224. Transistor 242 (sometimes referred to as a read transistor) may have a gate that receives control signal RD. To sample charge from storage capacitor 240, row select transistor 226 may be asserted while transistor 242 is asserted.

FIG. 7 also shows how pixel 34 may be split between at least two substrates. In the example of FIG. 7, bias voltage supply terminal 208, anti-blooming transistor 206, photodiode 202, transfer transistor 204, charge storage region 210, and threshold transistor 212 are all formed in substrate 302. Substrate 302 may be formed from a semiconductor such as silicon and therefore may be referred to as silicon substrate 302, semiconductor substrate 302, wafer 302, etc. Reset transistor 216, bias voltage supply terminal 218, floating diffusion region 214, dual conversion gain transistor 220, storage capacitor 222, threshold transistor 232, overflow transistor 236, integrating transistor 238, storage capacitor 240, read transistor 242, source follower transistor 224, bias voltage supply terminal 228, and row select transistor 226 may be formed in substrate 304. Substrate 304 may be formed from a semiconductor such as silicon and therefore may be referred to as silicon substrate 304, semiconductor substrate 304, wafer 304, etc.

A conductive interconnect layer 306 may be formed between substrate 302 and substrate 304. The conductive interconnect layer may be formed from any desired material. As shown in FIG. 7, conductive interconnect layer 306 may be coupled between threshold transistor 212 in substrate 302 and floating diffusion region 214 in substrate 304. This example is merely illustrative. In general, conductive interconnect 306 may be interposed between any desired components of pixel 34 and each component in the pixel may be formed in either substrate 302 or substrate 304. A conductive interconnect layer may be incorporated into any of the pixels described herein (e.g., conductive interconnect 306 may be formed between transistor 212 and floating diffusion region 214 of FIG. 4).

The example of FIG. 7 of pixel 34 being split between two substrates is merely illustrative. In general, any of the pixels herein may be formed in a single substrate, split between two substrates, split between more than two substrates, etc. For example, in one illustrative arrangement, bias voltage supply terminal 208, anti-blooming transistor 206, photodiode 202, transfer transistor 204, charge storage region 210, and threshold transistor 212 may be formed in a first substrate, reset transistor 216, bias voltage supply terminal 218, floating diffusion region 214, dual conversion gain transistor 220, source follower transistor 224, bias voltage supply terminal 228, and row select transistor 226 may be formed in a second substrate, and storage capacitor 222, threshold transistor 232, overflow transistor 236, integrating transistor 238, storage capacitor 240, and read transistor 242 may be formed in a third substrate.

Figure 8:
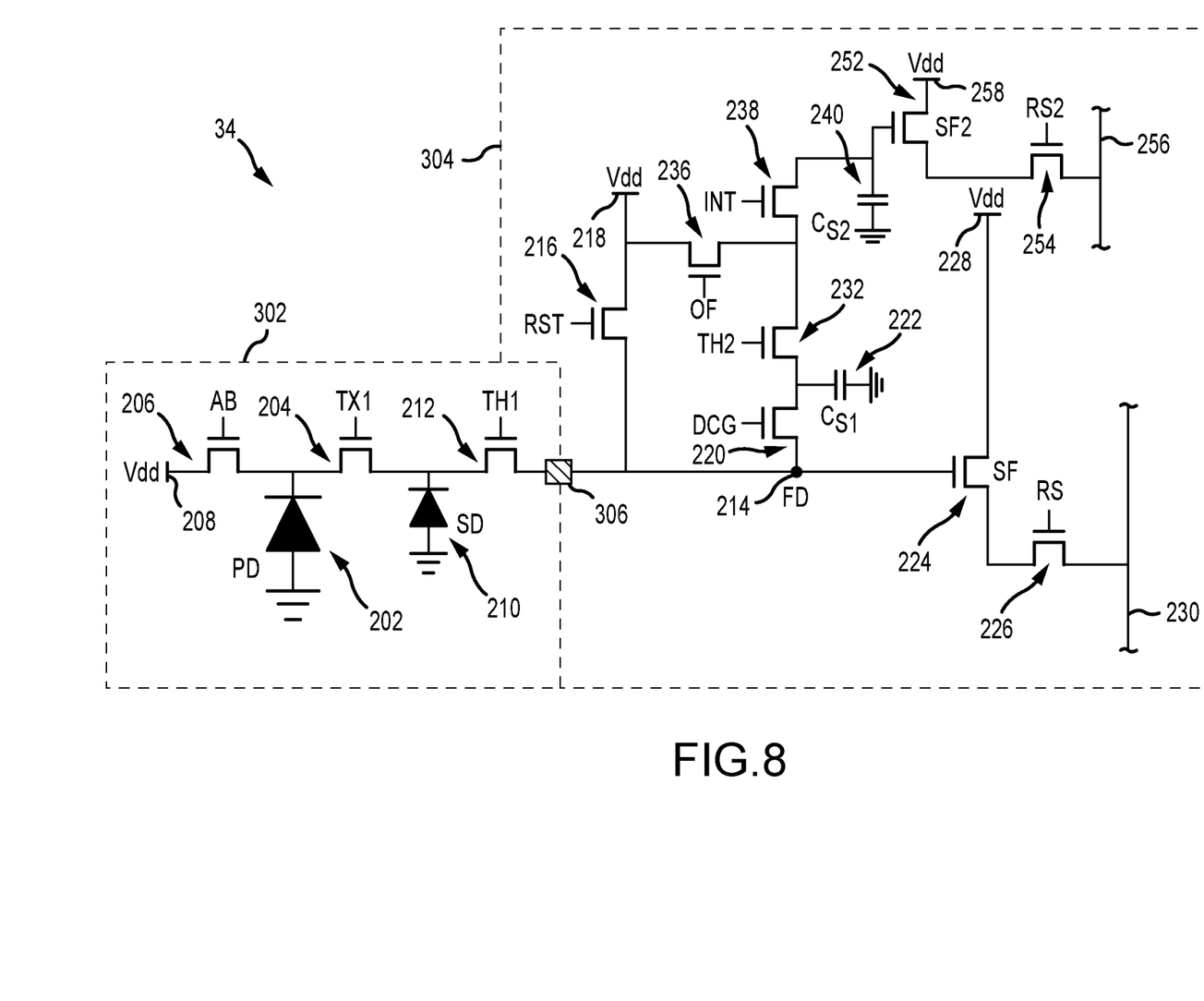
FIG. 8 is a circuit diagram of an illustrative imaging pixel with first and second storage capacitors, a charge directing structure, a second readout circuit for the second storage capacitor, and a conductive interconnect layer between first and second substrates in accordance with an embodiment.

FIG. 8 shows another arrangement for an imaging pixel with a first overflow capacitor and a charge directing structure that intermittently directs charge to a second overflow capacitor. As shown in FIG. 8, instead of reading the charge from storage capacitor 240 using source follower transistor 224 (as in FIGS. 4 and 7), an additional source follower transistor may be included in pixel 34. Source follower transistor 252 (SF2) may have a gate terminal that is coupled to storage capacitor 240. Source follower transistor 252 may be coupled between bias voltage supply terminal 258 and row select transistor 254. Row select transistor 254 may have a gate that receives control signal RS2. Row select transistor 254 may be interposed between source follower transistor 252 and column output line 256. The power supply voltage at power supplies 208, 218, 228, and 258 may be the same or may be different.

Source follower transistor 224 and row select transistor 226 may be referred to as a first readout circuit, whereas source follower transistor 252 and row select transistor 254 may be referred to as a second readout circuit. In some arrangements (as shown in FIG. 8), separate column output lines may be provided for the first and second readout circuits. In other arrangements, the first and second readout circuits may be coupled to the same column output line (e.g., row select transistor 254 in FIG. 8 may be coupled between source follower transistor 252 and column output line 230).

Similar to as shown in FIG. 7, the pixel of FIG. 8 is split between substrates 302 and 304 that are coupled by conductive interconnect layer 306. Bias voltage supply terminal 208, anti-blooming transistor 206, photodiode 202, transfer transistor 204, charge storage region 210, and threshold transistor 212 are all formed in substrate 302. Reset transistor 216, bias voltage supply terminal 218, floating diffusion region 214, dual conversion gain transistor 220, storage capacitor 222, threshold transistor 232, overflow transistor 236, integrating transistor 238, storage capacitor 240, read transistor 242, source follower transistor 224, bias voltage supply terminal 228, row select transistor 226, source follower transistor 252, bias voltage supply terminal 258, and row select transistor 254 may be formed in substrate 304.

In another example, the pixel of FIG. 8 may be split between more than two substrates. Bias voltage supply terminal 208, anti-blooming transistor 206, photodiode 202, transfer transistor 204, charge storage region 210, and threshold transistor 212 may be formed in a first substrate, reset transistor 216, bias voltage supply terminal 218, floating diffusion region 214, dual conversion gain transistor 220, source follower transistor 224, bias voltage supply terminal 228, and row select transistor 226 may be formed in a second substrate, and storage capacitor 222, threshold transistor 232, overflow transistor 236, integrating transistor 238, storage capacitor 240, read transistor 242, source follower transistor 252, bias voltage supply terminal 258, and row select transistor 254 may be formed in a third substrate.

The foregoing is merely illustrative of the principles of this invention and various modifications can be made by those skilled in the art. The foregoing embodiments may be implemented individually or in any combination.

What is claimed is:

1. An imaging pixel comprising:
   a photodiode configured to generate charge in response to incident light;
   a bias voltage supply terminal;

a first transistor coupled between the photodiode and the bias voltage supply terminal;
a charge storage region;
a second transistor coupled between the photodiode and the charge storage region;
a first capacitor, wherein a first portion of the charge from the photodiode is configured to overflow to the first capacitor;
a second capacitor, wherein a second portion of the charge from the photodiode is configured to overflow to the second capacitor;
a charge directing structure interposed between the first capacitor and the second capacitor; and
a third transistor coupled between the first capacitor and the charge directing structure, wherein the charge directing structure comprises a fourth transistor that is coupled between the third transistor and the second capacitor and a fifth transistor that is coupled between the third transistor and an additional bias voltage supply terminal.

2. The imaging pixel defined in claim 1, wherein some of the charge from the photodiode is configured to overflow through the third transistor from the first capacitor to a fully depleted node, wherein the fourth transistor is configured to transfer the charge from the fully depleted node to the second capacitor, and wherein the fifth transistor is configured to discard the charge from the fully depleted node.

3. The imaging pixel defined in claim 2,
wherein the fourth transistor is configured to be asserted while the fifth transistor is deasserted and wherein the fifth transistor is configured to be asserted while the fourth transistor is deasserted.

4. The imaging pixel defined in claim 1, further comprising:
a floating diffusion region; and
a sixth transistor that is interposed between the charge storage region and the floating diffusion region.

5. The imaging pixel defined in claim 4, further comprising:
a first source follower transistor coupled to the floating diffusion region; and
a second source follower transistor coupled to the second capacitor.

6. The imaging pixel defined in claim 4, further comprising:
a source follower transistor having a gate terminal that is coupled to the floating diffusion region; and
a seventh transistor that is interposed between the second capacitor and the gate terminal of the source follower transistor.

7. The imaging pixel defined in claim 4, further comprising:
a reset transistor coupled between the additional bias voltage supply terminal and the floating diffusion region; and
a dual conversion gain transistor that is coupled between the floating diffusion region and the first capacitor.

8. The imaging pixel defined in claim 1, wherein the photodiode and the first transistor are formed in a first substrate, wherein the first capacitor is formed in a second substrate, and wherein the imaging pixel further comprises a conductive interconnect layer between the first and second substrates.

9. An imaging pixel comprising:
a photodiode;
a charge storage region that is configured to receive charge from the photodiode;
a floating diffusion region;
a first threshold transistor, wherein charge is configured to overflow the first threshold transistor from the charge storage region to the floating diffusion region;
a first storage capacitor coupled to the floating diffusion region;
charge directing circuitry;
a second threshold transistor, wherein charge is configured to overflow the second threshold transistor from the first storage capacitor to the charge directing circuitry; and
a second storage capacitor, wherein the charge directing circuitry is configured to alternately discard charge and transfer charge to the second storage capacitor.

10. The imaging pixel defined in claim 9, further comprising:
an anti-blooming transistor coupled to the photodiode that is configured to couple the photodiode to a bias voltage supply terminal.

11. The imaging pixel defined in claim 9, wherein the charge directing circuitry comprises:
a first transistor that is interposed between the second threshold transistor and a bias voltage supply terminal; and
a second transistor that is interposed between the second threshold transistor and the second storage capacitor.

12. The imaging pixel defined in claim 11, wherein the first transistor is configured to be asserted while the second transistor is deasserted and wherein the second transistor is configured to be asserted while the first transistor is deasserted.

13. The imaging pixel defined in claim 9, further comprising:
a source follower transistor having a gate, wherein the floating diffusion region is coupled to the gate.

14. The imaging pixel defined in claim 13, further comprising:
a transistor coupled between the second storage capacitor and the gate.

15. The imaging pixel defined in claim 13, further comprising:
an additional source follower transistor having an additional gate, wherein the second storage capacitor is coupled to the additional gate.

16. An imaging pixel comprising:
a first semiconductor substrate;
a second semiconductor substrate;
a photodiode in the first semiconductor substrate;
a floating diffusion region in the second semiconductor substrate;
a first transistor in the first semiconductor substrate that sets a first threshold, wherein first overflow charge above the first threshold overflows the first transistor to the floating diffusion region;
a conductive interconnect layer interposed between the first transistor and the floating diffusion region;
a first charge storage region in the second semiconductor substrate that is configured to store the first overflow charge;
charge directing circuitry in the second semiconductor substrate; and
a second transistor in the second semiconductor substrate that sets a second threshold, wherein second overflow charge above the second threshold overflows the second transistor to the charge directing circuitry.

17. The imaging pixel defined in claim 16, further comprising:

a third transistor in the second semiconductor substrate that is interposed between the floating diffusion region and the first charge storage region.

18. The imaging pixel defined in claim 17, further comprising:
a second charge storage region in the second semiconductor substrate, wherein the charge directing circuitry comprises a fourth transistor interposed between the second transistor and a bias voltage supply terminal and a fifth transistor interposed between the second transistor and the second charge storage region.

* * * * *